United States Patent [19]
Volkova et al.

[11] 3,929,731
[45] Dec. 30, 1975

[54] PROCESS FOR THE PRODUCTION OF POLYMERIC ACETALS CONTAINING URETHANE, CARBAMIDE AND AMIDE GROUPS

[76] Inventors: Leman Mustafa Kyzy Volkova, Noginsky raion, p/o Chernogolovka, ulitsa Pervaya, 15, kv. 7; Gennady Vladimirovich Korolev, Noginsky raion, p/o Chernogolovka, ulitsa Vtoraya, 3, kv. 1, both of Moskovskaya oblast; Fedor Ivanovich Dubovitsky, Vorobievskoe shosse, 2b, kv. 12, Moscow; Irina Ivanovna Trostyanskaya, Solnechny pereulok, 4, kv. 5, Gatchina Leningradskoi oblasti; Leonid Yakovlevich Rappoport, Grazhdansky prospekt, 105, korpus 4, kv. 57; Gennady Nikolaevich Petrov, Zheleznodorozhny pereulok, 7, kv. 35, both of Leningrad; Mikhail Fedorovich Shestakovsky, prospekt Mira, 49, kv. 108, Moscow; Renat Dovletovich Yakubov, ulitsa Dimitrova, 81, kv. 14; Sergei Mikhailovich Maximov, ulitsa Gertsena, 9, kv. 6, both of Temirtau Karagandinskoi oblasti, all of U.S.S.R.

[22] Filed: June 27, 1974

[21] Appl. No.: 483,712

[30] Foreign Application Priority Data
June 28, 1973 U.S.S.R.............................. 1929172

[52] U.S. Cl. 260/77.5 B; 260/67 TN; 260/77.5 BB; 260/77.5 C
[51] Int. Cl.² .................. C08G 12/20; C08G 12/22
[58] Field of Search ... 260/77.5 B, 77.5 BB, 77.5 C, 260/67 TN

[56] References Cited
UNITED STATES PATENTS

| | | | |
|---|---|---|---|
| 2,802,022 | 8/1957 | Groszos et al.................. | 260/77.5 B |
| 2,928,812 | 3/1960 | Ernst............................. | 260/77.5 B |
| 3,277,098 | 10/1966 | Merten........................... | 260/77.5 B |
| 3,625,926 | 12/1971 | Donbenko...................... | 260/78.5 B |
| 3,646,223 | 2/1972 | Schreyer........................ | 260/77.5 B |

*Primary Examiner*—H. S. Cockeram
*Attorney, Agent, or Firm*—Steinberg & Blake

[57] ABSTRACT

A process for the production of polymeric acetals containing urethane, carbamide and amide groups and having the following general formula (1):

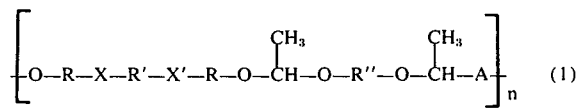

where
R is an alkylene

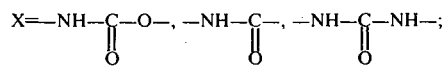

R' is an alkylene, an arylene, a biarylene, or is absent;

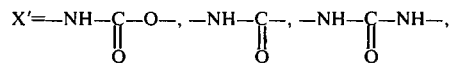

or is absent;
R'' is an alkylene, an oxaalkylene, a cycloalkylene, an arylene, or a biarylene;
A has the following general formula (II):

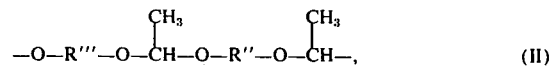

where R''' is chain of a polymeric diol having OH end-groups with a molecular weight of from 500 to 5,000, or is absent;
n is the degree of polyaddition equal to from 10 to 300, preferably from 20 to 110, which comprises a polyaddition reaction of diols of the following general formula (III):

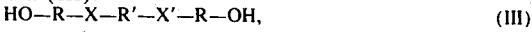

where R, R', X and X' are as in formula (I), or mixtures of said diols of formula (III) with polymeric diols having OH—end-groups of molecular wight of from 500 to 5,000, and divinyl ethers of the following general formula (IV):

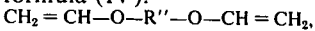

where R'' is as given by formula (I), in the presence of an acid catalyst.

29 Claims, No Drawings

PROCESS FOR THE PRODUCTION OF POLYMERIC ACETALS CONTAINING URETHANE, CARBAMIDE AND AMIDE GROUPS

The present invention relates to novel polymeric acetals containing urethane, carbamide and amide groups, as well as to a process for the production thereof.

Polymeric acetals containing urethane, amide or carbamide groups may find application as synthetic rubber, elastomers, coatings, adhesives, fibres, films, etc.

Those skilled in the art know of the existence of polymeric acetals of the following structure:

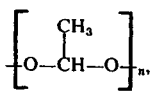

which are produced by polymerizing acetaldehyde. Amorphous polyacetaldehyde exhibits valuable rubber-like properties, but its low thermal stability prevents its use industrially (Junju Furukawa and Takeo Saegusa, Polymerization of Aldehydes and Oxides, New York - London, Sydney, 1963).

Polymers also exist containing urethane groups (polyurethanes) or amide groups (polyamides) or carbamide groups (polyureas). The high-cohesion urethane or amide or carbamide units in the macromolecules of these polymers lend them a high degree of strength, high degree of hardness and high melting points due to the formation of intermolecular hydrogen bonds.

The disadvantages of the above-listed polymers are their low solubility, low flexibility and poor elasticity, which add to the difficulty of processing and limit the field of their application (J. H. Saunders, K. C. Frisch, Polyurethanes, New York - London; H. Hopff, A. Muller, F. Wenger, Die poliamiden, Berlin, Rottingen - Heidelberg, 1954).

It is an object of the present invention to provide novel polymeric acetals which combine the elastic properties of polymeric acetals, on the one hand, with the strength of polyurethanes, polyamides and polyureas, on the other hand.

It is another object of the present invention to provide a versatile process for the production of polymeric acetals combining the elastic properties of polymeric acetals with the strength of polyurethanes, polyamides and polyureas.

It is a further object of the present invention to provide a process for the production of polymeric acetals exhibiting elasticity, strength and thermal stability with the use of readily available non-toxic feedstocks at satisfactorily high yields.

The foregoing objects are attained by the provision of polymeric acetals containing urethane, amide or carbamide groups.

In accordance with the invention, the process for the production of said polymeric acetals comprises reacting diols containing urethane, amide or carbamide groups with divinyl ethers in the presence of an acid catalyst, the reaction proceeding by a polyaddition mechanism.

The polymeric acetals containing urethane, amide or carbamide groups, in accordance with the invention, have the following general formula (I):

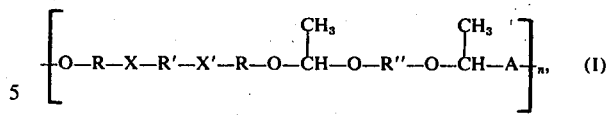

where
R is an alkylene;

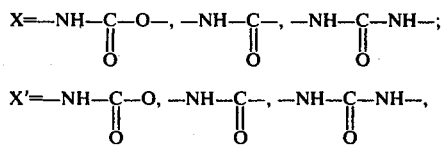

R' is an alkylene, an arylene, a biarylene, or is absent;
R'' is an alkylene, an oxaalkylene, a cycloalkylene, an arylene, or a biarylene;
A has the following general formula (II):

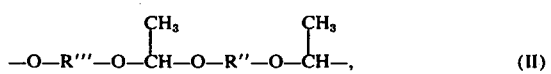

where R''' is a polymeric diol chain having OH endgroups of molecular weight from 500 to 5,000, or is absent;
n is the degree of polyaddition from 20 to 110.

The alkylene is said radicals R, R' and R'' may be methylene, ethylene, propylene, tetramethylene, pentamethylene, etc.

The arylene is R' R' and R'' may be phenylene, toluylene or xylylene. Naturally, the above compounds do not exhaust the list of suitable arylenes; other options may be naphthylylene, anthracenylene, etc.

The biarylene in R' and R'' may be n,n'-(diphenylene-2,2-propane), diphenylenemethane, etc.

The oxaalkylene in R'' may be 3-oxapentamethylene, 3,6-dioxaoctamethylene, etc.

The cycloalkylene in R'' is 1,4-cyclohexylene, though obviously other cycloaklylenes will also do, such as cyclopropylene, cyclobutylene, cyclopentylene, etc.

The polymers, wherein

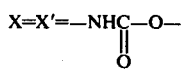

with R, R', R'', R''', n and A as set forth in formula (I), are classified with polyacetalurethanes.

The polymers, wherein

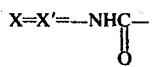

with R, R', R'', R''', n and A as set forth in formula (I), are classified with polyacetalamides.

The polymers, wherein

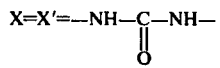

with R, R', R'', R''', n and A as set forth in formula (I), are classified with polyacetalcarbamides.

As follows from formula (I), in the macromolecules of polymeric acetals, the high-cohesion urethane, amide or carbamide units alternate with acetal

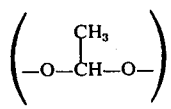

units.

Owing to the presence of oxygen atoms, the latter have a low internal rotation barrier, lending flexibility to the macromolecule, whereas the methyl side group prevents compact packing of the macromolecules, reducing the force of intermolecular interaction. Thus, in the macromolecules of said polymeric acetals, highly ordered rigid fragments arising between the urethane, amide and carbamide units due to the hydrogen bonds alternate with elastic disordered (due to the acetal bonds) fragments.

Said polymeric acetals have never been published and are therefore novel compounds.

Said polymeric acetals have a viscosity of from 0.3 to 0.8 (in a 1-percent benzene or dioxane solution), corresponding to molecular weights in the range from about 10,000 to about 55,000. All said polymers are readily soluble in organic solvents, e.g. acetone, benzene or dimethylformamide, forming stable solutions which endure lengthy storage without any viscosity variations.

The proposed polymeric acetals may find application as rubbers, elastomers, adhesives, films, fibres or coatings.

The elastic properties of said polyacetalurethanes vary widely depending on their structure.

The polyacetalurethanes in which

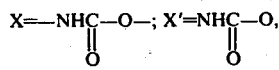

or is absent; and R, R', R'', R''', n and A are as set forth in formula (I), have molecular weights of from 10,000 to 55,000, viscosities in benzene and dioxane of from 0.3 to 0.8 and glass transition temperatures of from −50° to −8°C furthermore, they are soluble in organic solvents.

Polyacetalurethanes have a surprising novel property as against isocyanate polyurethanes, viz. improved compatibility with other polymers (thermoelastoplastics), by virtue of which they can be employed in combination with other polymers.

The polyacetalamides, wherein

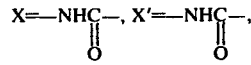

and R, R', R'', R''', n and A are as set forth in formula (I), have molecular weights of from 20,000 to 55,000, viscosities in benzene or dioxane of from 0.5 to 0.8, glass transition temperatures of from −3° to −25°C, and are soluble in organic solvents.

The polyacetalcarbamides, wherein

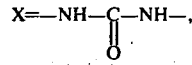

X' and R' are absent, and R, R'', R''', n and A are as set forth in formula (I), have molecular weights of from 10,000 to 40,000, viscosities of from 0.4 to 0.6 and glass transition temperatures of from −2° to −18°C.

In accordance with the invention, the process for the production of said polymers of formula (I), where R, R', R'', R''', X and X' are as set forth in formula (I) and A is absent, comprises effecting a reaction of polyaddition of diols of the general formula (III)

HO—R—X—R'—X'—R—OH, (III)

where

R is an alkylene with 1 to 6 carbon atoms;

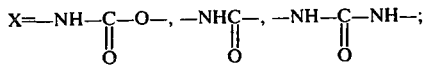

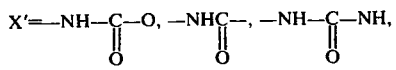

or is absent;

R' is an alkylene with 1 to 10 carbon atoms, an arylene, a biarylene, or is absent, to vinyl ethers of the general formula (IV)

$CH_2=CH-O-R''-O-CH=CH_2$, (IV)

where R'' is an alkylene with 1 to 6 carbon atoms, an oxaalkylene with 1 to 8 carbon atoms, a cycloalkylene, an arylene or a biarylene, in the presence of an acid catalyst.

The polyaddition reaction occurs between the hydroxyl endgroups of the diols of the general formula (III) and the vinyloxy end-groups of divinyl ethers of the general formula (IV) and leads to the forming of acetal bonds according to the following reaction route;

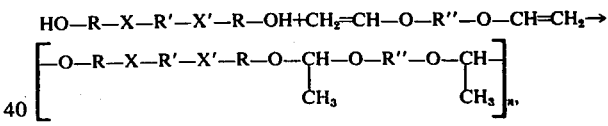

where R, R', R'', X and X' are as set forth in formula (I).

The proposed process permits the production of a wide range of polymeric acetals which are flexible plastics.

In order to produce polymeric acetals exhibiting rubberlike properties, i.e. improved elastic properties, the recommended reactants in the polyaddition reaction are mixtures of diol of formula (III) and polymeric diols.

The process for the production of polymers described by the general formula (I), where X and X' are as described hereinabove and A is as set forth in formula (II), comprises effecting a polyaddition reaction between a mixture composed of a diol of formula (III) and a polymeric diol with a molecular weight of from 500 to 5,000 having OH end-groups, and a vinyl ether as of formula (IV) in the presence of an acid catalyst.

The acid catalyst may be a strong mineral or organic acid, e.g. sulfuric acid, hydrochloric acid, phosphoric acid, p-toluenesulfonic acid, boron trifluoride, tin tetrachloride, or complexes of the above acids with organic bases, e.g. with diethyl ether, dibutyl ether, hexamethylphosphoramide, dioxane or tetrahydrofuran.

Said polymeric diols having OH end-groups may be polybutadiene glycol, polyisoprene glycol, polyethylene glycol adipate, polyethylene glycol sebacate, polybutadiene glycol adipate, polyethylene glycol azelate, polyethylene glycol terephthalate, polyethylene oxide, polytetramethylene oxide, as well as ethylene oxide and tetramethylene oxide copolymers with propylene oxide. Naturally, apart from the above-listed polymeric diols, other analogous polymeric diols can be employed provided their molecular weights are within the range from 500 to 5,000 and they contain OH end-groups.

The initial diols containing urethane groups complying with formula (III) may be bis-(2-hydroxyethyl)-carbamate, piperazine-N,N'-bis-(2-hydroxyethyl)-carbamate, 2,4-xylylenebis-(2-hydroxyethyl)-carbamate, etc. Said initial urethane-containing diols complying with formula (III) are produced in a conventional way be reacting ethanolamine and other aliphatic and aliphatic-aromatic diamines with monocyclocarbonates (without using diisocyanates). With said urethane-containing diols employed as the initial substances, polyacetalurethanes can be produced dispensing with the use of diisocyanates which, being highly toxic, constitute a major occupational hazard and a source of environmental pollution; furthermore, any process employing diisocyanates requires sophisticated and costly equipment.

It should be noted, however, that there exist alternative ways of manufacturing urethane-containing diols, but for the purposes of the proposed process the route by which the initial urethane-containing diols are produced is not in question as long as they comply with formula (III).

The starting diols containing carbamide groups and complying with formula (III) are dimethylol urea and diethylol urea.

The starting diols containing amide groups and complying with formula (III) are dimethylol and diethylol derivatives of dicarboxylic acid diamides, including N,N'-diethylol succinamide, N,N-dimethylol adipamide, N,N'dimethylol sebamide, N,N-dimethylol terephthalamide, etc.

All the above-listed diols are readily available substances.

The initial divinyl ethers complying with formula (IV) are compounds having at least two vinyl oxy groups in the molecule, including divinyl ether, divinyl hydroxymethylene, predominantly divinyl ethers of glycols, e.g. divinyl ethers of ethylene glycol, diethylene glycol, triethylene glycol, hydroquinone 2,2-diphenylol propane, as well as 1,4-divinyl oxynaphthalene, N,N'-divinyloxydiphenyl and 1,4-divinyloxycyclohexane. It will be appreciated that other divinyl ethers, including cyclic ones, can be employed provided they are capable of taking part in the polyaddition reaction with the diols of formula (III). Divinyl ethers manufactured on the basis of glycols and acetylene are easily available and cheap substances.

The divinyl ether of formula (IV) and the diol of formula (III) are used in a stoichiometric ratio, i.e. the concentration ratio of the vinyloxy groups to the hydroxyl groups should be close to unity:

$$\frac{[CH_2=CH]}{[OH]} = 1 \pm 0.15.$$

In a mixture of a diol complying with formula (III) with said polymeric diol, the concentration of the vinyloxy groups should equal the overall concentration of the hydroxyl groups of the diol mixture.

The polyaddition reaction proceeds in a wide temperature range, viz. from −40° to +100°C, the temperature being selected within said limits depending on the properties of the initial components as well as on the desired properties of the end product.

The reaction time ranges from several minutes to several days, preferably from 2 minutes to 10 hours.

It should be noted that, contrary to expectations, the urethane, amide and carbamide groups basic though they are by their nature, fail to slow down the polyaddition reaction in spite of their potential for deactivating the acid catalyst.

It should be mentioned in conclusion that the process of this invention is suitable for the manufacture of polymeric acetals containing simultaneously two or three types of the above-listed groups. In such a case, a mixture of two or three different diols of formula (III), e.g. a mixture of a urethane-containing diol and a carbamide-containing diol, is subjected to polyaddition.

The polyaddition reaction is carried out in the absence of solvent. Of course, should the particular flow sheet require it, the process may likewise be carried out in an inert solvent, e.g. acetone, dioxane, dimethylformamide, etc. without any change in the course thereof.

Practice of the novel process of this invention may be further understood by reference to the following examples.

EXAMPLE 1

31.2 g (0.1 mole) of a urethane-containing diol, 2,4-xylylene-bis-(2-hydroxyethyl)-carbamate, is introduced into a reactor and dried with stirring for 1 hour at 80°C and 1 mm Hg. After the drying is over, 11.4 g (0.1 mole) of divinyl ether of ethylene glycol is added to the reaction mass, the mixture is vigorously agitated, and 0.47 g of p-toluene-sulfonic acid is added. The temperature of the mixture is maintained at 60°C for 2 hours. After the reaction is over, the polymer product is recovered. To this end, 1 g of finely ground potash having catalyst-neutralizing properties and 200ml of acetone are added to the mixture, the mixture is stirred until the polymer completely solubilizes, and the resultant solution is filtered. The polymer is precipitated from the filtrate with benzene and dried under vacuum (1 mm Hg) at 50°C to a constant weight. The product is 40 g of a yellowish-white flexible polymer having an intrinsic viscosity [η] of 0.31 and a glass transition temperature of −10°C which can be converted to elastic films and fibres.

EXAMPLE 2

15.8 g (0.1 mole) of divinyl ether of diethylene glycol is added to 34.2 g (0.1 mole) of 2,4-xylylene-bis 2-hydroxy-1-methyl)-ethylcarbamate, and 0.25 g of orthophosphoric acid is added to the resultant mixture. The mixture thus obtained is heated for 6 hours, and then the polymer is recovered. To this end, 300 ml of acetone and 0.5 ml of triethylamine are added to the mixture, the solution is filtered, the polymer is precipitated with 250 ml of heptane and dried under vacuum (1 mm Hg) at 50°C to a constant weight to yield 39 g of a slightly yellowish flexible polymer having an intrinsic viscosity [η] of 0.55 and a glass transition temperature of −0.12°C which can be converted to films and fibres.

EXAMPLE 3

31.2 g (0.1 mole) of 2,4-xylylene-bis-(2-hydroxyethyl)-carbamate is introduced into a reaction vessel and dried for 1 hour at 50°C and 1 mm Hg. Then 15.8 g (0.1 mole) of divinyl ether of diethylene glycol is added. A solution of 0.01 g hydrogen chloride in 0.5 ml of vinyl ether is added with vigorous stirring. The temperature of the mixture is maintained at 60°C for 1 hour to allow the reaction to come to an end. Then ammonia is supplied into the reaction vessel in order to neutralize the catalyst, and the polymer is maintained in the ammonia atmosphere for 6 hours. The product is a yellowish-white flexible polymer of intrinsic viscosity $[\eta] = 0.58$ and glass transition temperature = $-10°C$ which can be converted to flexible fibres and films. The polymer product exhibits excellent compatibility with polybutadienestyrene thermoplastics.

EXAMPLE 4

0.155 g of concentrated sulfuric acid is added with stirring to a mixture of 14.9 g (0.1 mole) of bis-(2-hydroxyethyl)-carbamate and 16.2 g (0.1 mole) of divinyl ether of triethylene glycol. The mixture is heated for 20 hours at 60°C. 0.2 g of finely ground catalyst-neutralizing potash and 200 ml of acetone are added to the resultant polymer, the mixture is agitated until the polymer completely solubilizes, the solution is filtered and the polymer precipitated with benzene to yield 29 g of a flexible polymer havine $[\eta] = 0.39$ and vitrification temperature = $-15°C$. The polymer product can be converted to films and fibres.

EXAMPLE 5

23.4 g (0.1 mole) of piperazine N,N'-bis-hydroxyethyl-carbamate is introduced into a reaction vessel, and 14.4 g of 1,4-divinyloxycyclohexane is added. 0.01 g of hydrogen chloride dissolved in 0.2 ml of absolute diethyl ether is added to the mixture. The resultant polymer is recovered in the following manner: 0.2 g of finely ground potash and 250 ml of acetone are added and the mixture is agitated until all the polymer solubilizes. Then the solution is filtered, the polymer precipitated with heptane and dried under vacuum (1 mm Hg) at 50°C to a constant weight to yield 35 g of a flexible polymer which can be converted to films and fibres.

EXAMPLE 6

A mixture of 31.2 g (0.1 mole) of 2,4-xylylene-bis-(2-hydroxyethyl)carbamate and 130 g (0.1 mole) of polybutadiene glycol of mw 1,300 is dried at 40°C for 1 hour at a residual pressure of 1 mm Hg. Then the vacuum is disconnected, and 32.4 g (0.2 mole) of divinyl ether of hydroquinone and 0.5 ml of hydrogen chloride dissolved in absolute diethyl ether are poured into the mixture. The reaction mass is left at room temperature for 72 hours, within which time the mixture loses all its fluidity. The polymer is recovered in the following manner: 0.4 g of finely ground potash and 450 ml of benzene are added to the resultant mass. After the polymer has solubilized, the solution is filtered, and the polymer is precipitated with 500 ml of ethanol and dried under vacuum to a constant weight. The linear rubber product of intrinsic viscosity $[\eta] = 0.78$ and glass transition temperature = $-30°C$ can be converted to an elastomer by peroxide cure.

EXAMPLE 7

A mixture of 15.6 g (0.05 mole) of 2,4-xylylene-bis(2-hydroxyethyl)carbamate and 195 g (0.15 mole) of polybutadiene glycol of mw 1,300 is dried at 40°C for 1 hour at a residual pressure of 1 mm Hg. Then the vacuum is disconnected, and 32.4 g (0.2 mole) of divinyl ether of hydroquinone and 0.5 ml of hydrogen chloride dissolved in absolute diethyl ether are poured into the mixture. The reaction mass is left at room temperature for 70 hours, within which time the mixture loses all its fluidity. The polymer product is recovered in the following manner: 0.5 g of finely ground potash and 450 ml of benzene are added to the reaction mass, and the latter is agitated. After the polymer has solubilized, the benzene solution is filtered, the polymer precipitated with 500 ml of ethanol and dried to a constant weight under vacuum (1 mm Hg) at 50°C to yield 220 g of a rubber-like polymer of intrinsic viscosity $[\eta] = 0.70$ and glass transition temperature = $-50°C$ which can be converted to an elastomer by peroxide cure.

EXAMPLE 8

A mixture of 46.8 g (0.15 mole) of 2,4-xylylene-bis-(2-hydroxyethyl)carbamate and 65 g (0.04 mole) of polybutadiene glycol of mw 1,300 is dried at 60°C for 1 hour at a residual pressure of 1 mm Hg. Then the vacuum is disconnected, and 32.4 g (0.2 mole) of divinyl ether of hydroquinone and, with vigorous stirring, 0.5 ml of hydrogen chloride dissolved in absolute diethyl ether are poured into the mixture. The reaction mass is left at room temperature for 70 hours, within which time the mixture loses all its fluidity. The polymer product is recovered in the following manner: 0.5 g of finely ground potash and 450 ml of benzene are added to the reaction mass. After the polymer has solubilized, the benzene solution is filtered, the polymer precipitated with 500 ml of ethanol and dired under vacuum (1 mm Hg) at 50°C to yield 223 g of a rubber-like polymer of intrinsic viscosity $[\eta] = 0.75$ and glass transition temperature = $-40°C$ which can be converted to an elastomer by peroxide cure.

EXAMPLE 9

A mixture of 31.2 g (0.1 mole) of 2,4-xylylene-bis-(2-hydroxyethyl)carbamate and 130 g (0.1 mole) of polybutadiene glycol of mw 1,300 is dried at 60°C for 1 hour at a pressure of 1 mm Hg. Then the vacuum is disconnected, and 31.6 g (0.2 mole) of divinyl ether of diethylene glycol and, with vigorous stirring, 0.5 ml of hydrogen chloride dissolved in absolute diethyl ether are poured into the mixture. The reaction mass is left at room temperature for 70 hours, within which time the mixture loses all its fluidity. The polymer product is recovered in the following manner: 0.5 g of finely ground potash and 500 ml of benzene are added to the reaction mass. After the polymer has solubilized, the benzene solution is filtered, the polymer precipitated with 500 ml of ethanol and dried to a constant weight under vacuum (1 mm Hg) at 50°C to yield 218 g of a rubber-like polymer of intrinsic viscosity $[\eta] = 0.50$ and glass transition temperature = $-50°C$ which can be converted to an elastomer by peroxide cure.

EXAMPLE 10

31.2 g (0.1 mole) of 2,4-xylyene-bis-(2-hydroxyethyl) carbamate and 185 parts by weight (0.1 mole of polyethylene glycol adipate having OH end-groups (mw 1,850) are introduced into a reaction vessel and dried at 80°C under vacuum at a pressure of 1 mm Hg for 1 hour. Then the vacuum is disconnected, and 31.6 g (0.2 mole) of divinyl ether of diethylene glycol is added to the mixture. The mixture is vigorously agitated and 0.6 g of hydrogen chloride dissolved in 1 ml of dibutyl ether is added. The mixture is maintained for 30 minutes at a temperature of 80°C. As soon as the reaction is over, the polymer is recovered. To this end, 1 g of finely ground potash and 350 ml of acetone are added to the mixture, and the latter is agitated until the polymer completely solubilizes. Then the solution is filtered, the polymer is precipitated with 500 ml of heptane and dried under vacuum (1 mm Hg) at 50°C to a constant weight to yield 240 g of a rubberlike polymer of intrinsic viscosity $[\eta] = 0.63$ and glass transition temperature $= -30°C$ which can be converted to an elastomer by vulcanization.

EXAMPLE 11

A mixture of 24.96 g (0.08 mole) of 2.4-xylylene-bis-(2-hydroxyethyl)-carbamate and 37 g (0.02 mole) of polyethylene glycol adipate having OH end-groups (mw 1,850) is dried at 80°C under vacuum (1 mm Hg) for 1 hour. Then the vacuum is disconnected, and 17.0 g (0.1 mole) of divinyl ether of 1,6-hexane diol is added to the mixture. The latter is vigorously agitated, and 0.6 g of hydrogen chloride dissolved in 1 ml of absolute diethyl ether is added. The mixture is maintained at 80°C for 45 minutes. When the reaction is over, the polymer is recovered. To this end, 1 g of finely ground potash and 350 ml of acetone are added to the reaction mass, the latter is agitated until the polymer completely solubilizes, the solution is filtered, the polymer is precipitated from the filtrate with 500 ml of heptane and dried under vacuum (50°C, 1 mm Hg), to a constant weight to yield 60.3 g of a rubber-like polymer of intrinsic viscosity $[\eta] = 0.55$ and glass transition temperature $= -27°C$ which can be converted to an elastomer by vulcanization.

EXAMPLE 12

In this example, the procedure of Example 11 is duplicated except that the divinyl ether is 14.2 g (0.1 mole) of divinyl ether of 1,4-butane diol.

EXAMPLE 13

A mixture of 14.9 g (0.1 mole) of bis-(2-hydroxyethyl) carbamate and 185 g (0.1 mole) of polyethylene glycol adipate is dried under vacuum (1 mm Hg) at 80°C for 1 hour. Then the vacuum is disconnected, and 31.6 g (0.2 mole) of divinyl ether of diethylene glycol is added to the mixture. The latter is vigorously agitated, and 0.6 g of hydrogen chloride dissolved in 1 ml of dioxane is added to the mixture. The mixture is maintained at a temperature of 80°C for 2 hours. When the reaction is over, the polymer is recovered. To this end, 1 g of finely ground potash and 350 ml of acetone are added to the reaction mass, and the latter is stirred until the reaction mass completely solubilizes. The solution is filtered the polymer is precipitated from the filtrate with 500 ml of heptane and dried under vacuum (50°C, 1 mm Hg) to a constant weight to yield 215 g of a rubber-like polymer of intrinsic viscosity $[\eta] = 0.49$ and glass transition temperature $= -32°C$ which can be converted to an elastomer by vulcanization.

EXAMPLE 14

A mixture of 14.9 g (0.1 mole) of bis-(2-hydroxyethyl) carbamate and 185 g (0.1 mole) of polyethylene glycol adipate having OH end-groups is dried under vacuum (1 mm Hg) at 80°C for 1 hour. Then the vacuum is disconnected, and 56 g (0.2 mole) of n,n'-divinyloxydiphenylolpropane is added to the mixture. The latter is vigorously agitated, and 0.6 g of hydrogen chloride dissolved in 1 ml of absolute diethyl ether is added. The reaction mass is maintained at 80°C for 2 hours. When the reaction is over, the polymer is recovered. To this end, 1 ml of triethylamine and 500 ml of acetone are added to the mixture, and the latter is stirred until the polymer completely solubilizes. The solution is filtered, and the polymer is precipitated from the filtrate with 400 ml of heptane. The polymer is dried under vacuum (1 mm Hg) at 50°C to a constant weight to yield 210 g of a rubber-like polymer of intrinsic viscosity $[\eta] = 0.58$ and glass transition temperature $= -25°C$.

EXAMPLE 15

In this example, the procedure of Example 14 is duplicated except that the vinyl ether is diphenylolmethane vinyl ether.

EXAMPLE 16

A mixture of 31.2 g (0.1 mole) of 2,4-xylylene-bis-(2-hydroxyethyl)-carbamate and 210 g (0.1 mole) of a tetrahydrofuran copolymer with propylene oxide having OH end-groups is dried under vacuum (1 mm Hg) at 80°C for 1 hour. Then the vacuum is disconnected, and 31.6 g (0.2 mole) of divinyl ether of diethylene glycol is added to the mixture. The latter is vigorously agitated, and 0.2 g of hexamethylphosphoramide hydrochloride is added thereto. The temperature of the mixture is maintained at 80°C for 2 hours. When the reaction is over, the polymer is recovered. To this end, 1 ml of triethylamine and 500 ml of acetone are added to the mass, and the latter is stirred until the polymer completely solubilizes. The solution is filtered, the polymer is precipitated from the filtrate with 450 ml of benzene and dried under vacuum (1 mm Hg) at 50°C to a constant weight to yield 240 g of a rubber-like polymer of intrinsic viscosity $[\eta] = 0.60$ and glass transition temperature $= -40°C$.

EXAMPLE 17

11.8 g (0.1 mole) of dimethylol urea and 16.8 g (0.1 mole) of divinyl ether of hydroquinone are introduced into a reaction vessel. 0.2 ml of absolute diethyl ether containing 0.01 g of hydrogen chloride is added with vigorous stirring at a temperature of 40°C. The mixture is maintained at 50°C for 3 hours. The polymer is recovered by adding 1 ml of triethylamine and 250 ml of dimethylformamide to the reaction mixture and agitating same until the polymer completely solubilizes. Then the solution is filtered, the polymer is precipitated from the filtrate with 250 ml of benzene and dried under vacuum (1 mm Hg) at 50°C to a constant weight to yield 24 g of a cream-coloured polymer of intrinsic viscosity $[\eta] = 0.43$ and glass transition temperature $= -5°C$. The polymer can be converted to fibres and films.

EXAMPLE 18

11.8 g (0.1 mole) of dimethylol urea and 15.8 g (0.1 mole) of divinyl ether of diethylene glycol are introduced into a reaction vessel. 1 ml of dibutyl ether containing 0.3 g of hydrogen chloride is added to the mixture with vigorous stirring at 40°C. The mixture is maintained at 50°C for 4 hours. The polymer is recovered by adding to the reaction mass 1.5 g of finely ground potash and 250 ml of dimethylformamide and agitating the resultant mass until the polymer completely solubilizes. Then the solution is filtered, the polymer is precipitated with 250 ml of benzene and dried under vacuum (1 mm Hg) at 50°C to a constant weight to yield 22 g of a cream-coloured polymer of intrinsic viscosity $[\eta] = 0.48$ and glass transition temperature $= -2°C$. The polymer can be converted to films and fibres.

EXAMPLE 19

A mixture of 146 g (0.1 mole) of diethylol urea and 16.8 g (0.1 mole) of hydroquinone vinyl ether is prepared. 0.4 g of hydrogen chloride dissolved in 1 ml of dibutyl ether is added with stirring at a temperature of 60°C. The polymer is recovered in a procedure similar to that of Example 18 to yield 26 of a polymer of intrinsic viscosity $[\eta] = 0.59$ and glass transition temperature $= -2°C$. The polymer can be converted to fibres and films.

EXAMPLE 20

A mixture of 5.9 g (0.05 mole) of dimethylol urea and 65 g (0.05 mole) of polybutadiene glycol of mw 1,300 having OH end-groups is dried at 40°C under vacuum (1 mm Hg) for 1 hour. Then the vacuum is disconnected, 16.8 g (0.1 mole) of divinyl ether of hydroquinone is poured into the mixture, and 0.3 g of hydrogen chloride dissolved in 1 ml of dibutyl ether is added with vigorous stirring. The mixture is maintained at 40°C for 8 hours. The polymer is recovered by pouring 350 ml of benzene containing 1 ml of triethylamine into the reaction mass, and the latter is stirred until the polymer completely solubilizes. The solution is filtered and the polymer precipitated from the filtrate with 280 ml of ethanol to give a rubber-like polymer of intrinsic viscosity $[\eta] = 0.44$ and glass transition temperature $= -15°C$. The polymer can be converted to an elastomer by peroxide cure.

EXAMPLE 21

A mixture of 5.9 g (0.05 mole) of dimethylol urea and 92.5 g of polyethylene glycol adipate of mw 1,850 having OH end-groups is dried under vacuum (1 mm Hg) at 50°C for 1 hour. Then the vacuum is disconnected, and 15.8 g (0.1 mole) of diethylene glycol vinyl ether is poured into the mixture. The reaction mass is vigorously agitated, and 0.4 g of hydrogen chloride dissolved in 1 ml of dibutyl ether is added thereto. The mixture is maintained at 60°C for 10 hours. The polymer is recovered by adding 400 ml of acetone containing 1 ml of triethylamine to the reaction mass and agitating same until the polymer solubilizes. The solution is filtered, the polymer precipitated from the filtrate with heptane and dried at 50°C and 1 mm Hg to a constant weight to yield 110 g of a rubber-like polymer of intrinsic viscosity $[\eta] = 0.55$ and glass transition temperature $= -18°C$.

EXAMPLE 22

A mixture is prepared from 17.6 g (0.1 mole) of N,N'-dimethylol adipamide and 15.8 g (0.1 mole) of divinyl ether of diethylene glycol 0.01 g of hydrogen chloride dissolved in 1 ml of absolute diethyl ether is added to the mixture with vigorous stirring. The mixture is maintained at 60°C for 12 hours, after which the polymer is recovered. To this end, 0.5 g of finely ground potash and 300 ml of acetone are added to the mixture, and the latter is agitated until the polymer is solubilized. The solution is filtered, the polymer is precipitated from the filtrate with heptane and dried under vacuum (1 mm Hg) at 50°C to a constant weight to give a white-coloured polymer of intrinsic viscosity $[\eta] = 0.56$ and glass transition temperature $= -3°C$. The polymer can be converted to films and fibres.

EXAMPLE 23

20.4 g (0.1 mole) of N,N'-diethylol succinamide and 15.8 g (0.1 mole) of divinyl ether of diethylene glycol are introduced into a reaction vessel. 0.1 g of hexamethylphosphoramide hydrochloride is added to the mixture with vigorous stirring. The mixture is maintained at 60°C for 15 hours. The polymer is recovered in a procedure similar to that of Example 22. The properties of the polymer are similar to those of the polymer of Example 22.

EXAMPLE 24

A solution of 0.3 g of hydrogen chloride in 1 ml of diethyl ether is added with vigorous stirring at 50°C to a mixture of 22.4 g (0.1 mole) of N,N'-dimethylol terephthalamide and 15.8 g (0.1 mole) of divinyl ether of diethylene glycol. The mixture is maintained at 50°C for 25 hours. The polymer is recovered in a procedure similar to that of Example 22.

EXAMPLE 25

A mixture of 28.8 g (0.1 mole) of N,N'-dimethylol sebamide and 16.2 g (0.1 mole) of divinyl ether of hydroquinone is introduced into a reaction vessel, and 0.3 g of hydrogen chloride dissolved in 1 ml of absolute diethyl ether is added to the mixture with vigorous stirring. The temperature of the mixture is maintained at 50°C for 15 hours. The polymer is recovered by adding to the reaction mass 1 g of finely ground potash to neutralize the catalyst and 300 ml of dimethylformamide, and the mixture is stirred until the polymer solubilizes. The solution is filtered, the polymer is precipitated from the filtrate with heptane and dried under vacuum (1 mm Hg) at 50°C to a constant weight. The polymer having an intrinsic viscosity $[\eta]$ of 0.60 and a glass transition temperature of $-5°C$ can be converted to fibres.

EXAMPLE 26

A mixture of 88 g (0.05 mole) of N,N'-dimethylol adipamide and 65 g (0.05 mole) of polybutadiene glycol of mw 1,300 having OH end-groups is dried under vacuum at 50°C for 1 hour. Then the vacuum is disconnected, and 15.8 g (0.1 mole) of divinyl ether of hydroquinone is poured into the mixture. The latter is vigorously agitated, and 0.5 g of hydrogen chloride dissolved in 1 ml of dibutyl ether is added thereto. The mixture is maintained at 50°C for 20 hours. Then the polymer is recovered by adding to the mixture 400 ml of benzene containing 1 ml of triethylamine and agitating the mixture until the polymer solubilizes. The solution is filtered, the polymer is precipitated from the filtrate with 450 ml of ethanol and dried under vacuum (1 mm Hg) at 50°C to a constant weight. The resultant rubber-like polymer of intrinsic viscosity $[\eta] = 0.48$ and glass transition temperature $= -25°C$ can be converted to an elastomer by peroxide cure.

EXAMPLE 27

A mixture of 11.2 g (0.05 mole) of N,N'-dimethylol terephthalamide and 92.5 g (0.05 mole) of polyethylene glycol adipate of mw 1,850 having OH end-groups is dried for 1 hour under vacuum (1 mm Hg) at 50°C. Then the vacuum is disconnected, and 15.8 g (0.1 mole) of divinyl ether of diethylene glycol is poured into the mixture. The latter is vigorously agitated, and 0.6 g of hydrogen chloride dissolved in 1.2 ml of dipropyl ether is added thereto. The mixture is maintained at 50°C for 20 hours. Then the polymer is recovered by pouring 400 ml of acetone containing 1 ml of triethylamine into the reaction mass and agitating the mixture for the polymer to solubilize. The solution is filtered, the polymer is precipitated with 400 ml of heptane and dried under vacuum (1 mm Hg) at 50°C to a constant weight to yield a polymer of intrinsic viscosity $[\eta] = 0.67$ and glass transition temperature $= -8°C$ which can be converted to an elastomer by vulcanization.

EXAMPLE 28

260 g (0.2 mole) of polybutadiene glycol and 17.4 g (0.1 mole) of 2,4-toluylene diisocyanate of mw 2,700 are used to prepare a urethane-containing diol by a conventional method. A mixture of 270 g (0.1 mole) of the urethane-containing diol and 16.2 g (0.1 mole) of divinyl ether of hydroquinone is vigorously agitated, and 0.5 g of hydrogen chloride dissolved in 1.5 ml of absolute diethyl ether is added thereto. The mixture is maintained at 60°C for 20 hours. Then the polymer is recovered by adding 500 ml of benzene containing 1 ml of triethylamine to the mixture, and agitating same until the polymer solubilizes. The solution is filtered, the polymer is precipitated from the filtrate with 400 ml of ethanol and dried under vacujm (1 mm Hg) at 50°C to a constant weight. The polymer has an intrinsic viscosity $[\eta]$ of 0.8 and a glass transition temperature of $-25°C$.

EXAMPLE 29

A mixture of 8.8 g (0.05 mole) of N,N'-dimethylol adipamide and 15.6 g (0.05 mole) of 2,4-xylylene-bis-(2-hydroxy-ethyl)-carbamate is dried at 60°C and 1 mm Hg for 1 hour. Then the vacuum is disconnected, and 15.8 g (0.1 mole) of divinyl ether of diethylene glycol is poured into the mixture. The latter is vigorously agitated, and 0.4 g of hydrogen chloride dissolved in 1.3 ml of dioxane is added thereto. The mixture is maintained at 60°C for 2 hours. As soon as the reaction is over, the polymer is recovered in a procedure similar to that of Example 1. The polymer has an intrinsic viscosity $[\eta]$ of 0.64 and a glass transition temperature of $-4°C$.

EXAMPLE 30

A mixture of 15.6 g (0.05 mole) of 2,4-xylylene-bis-(2-hydroxyethyl)-carbamate and 5.9 g (0.05 mole) of dimethylol urea is dried at 50°C under vacuum (1 mm Hg). Then the vacuum is disconnected, and 15.8 g (0.1 mole) of divinyl ether of diethylene glycol is poured into the mixture. The latter is vigorously agitated, and 0.4 g of hydrogen chloride dissolved in 1.3 ml of dioxane is added thereto. The mixture is maintained at 60°C for 2 hours. When the reaction is over, the polymer is recovered in a procedure similar to that of Example 1. The polymer has an intrinsic viscosity $[\eta]$ of 0.72 and a glass transition temperature of $-2°C$.

EXAMPLE 31

118.2 g (1 mole) of 1,6-hexane diol and 87 g (0.5 mole) of toluylene-2,4-diisocyanate are reacted at 60°C to produce an urethane-containing diol. A mixture of 41.04 g (0.1 mole) of the resultant urethane-containing diol and 162 g (1 mole) of divinyl ether of hydroquinone is admixed with stirring at 60°C with 0.2 g of hydrogen chloride dissolved in 0.5 ml of absolute diethyl ether. The polymer is recovered in a procedure described in Example 1.

EXAMPLE 32

In this example, the procedure of Example 31 is duplicated except that the diisocyanate is diphenylmethane diisocyanate.

What is claimed is:

1. Polymeric acetals of the formula:

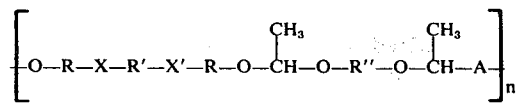

where

R is an alkylene with 1 to 6 carbon atoms;

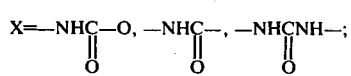

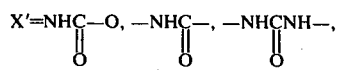

or is absent;

R' is an alkylene with 1 to 10 carbon atoms, an arylene, a biarylene, or is absent;

R" is an alkylene with 1 to 6 carbon atoms, an oxaalkylone with 1 to 8 carbon atoms, a cycloalkylene, an arylene, or a biarylene;

A has the formula:

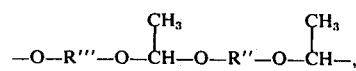

where R''' is a chain of polymeric diol having OH end-groups with a molecular weight of from 500 to 5,000, or is absent;

n is equal to 10 to 300.

2. Polymeric acetals as set forth in claim 1, in which the polymeric diol having OH end-groups with a molecular weight of from 500 to 5,000 is selected from the group comprising polybutadiene glycol, polyisoprene glycol, polyethylene glycol adipate, polyethylene glycol sebacate, polyethylene glycol azelate, polyethylene glycol terephthalate, polyethylene glycol isophthalate, polyethylene oxide diol, polytetramethylene oxide diol, and copolymers of ethylene oxide and tetramethylene oxide with propylene oxide.

3. Polymeric acetal as set forth in claim 1, in which

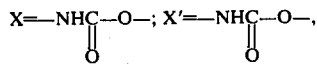

or is absent; and R, R', R'', R''', n and A are as defined in claim 1, having molecular weights of 10,000 to 55,000, viscosities in benzene or dioxane of 0.3 to 0.8 and glass transition temperatures of −50°C to −8°C.

4. A polymeric acetal as set forth in claim 3, in which

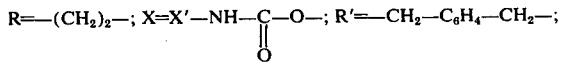

R''=—CH$_2$CH$_2$OCH$_2$CH$_2$—;

and A is absent, having a viscosity in dioxane of 0.58 and a glass transition temperature of −10°C.

5. A polymeric acetal as set forth in claim 3, in which

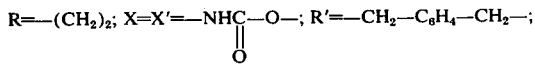

R''=CH$_2$CH$_2$OCH$_2$CH$_2$—;

and A is as defined in claim 1, where R''' is a polyethylene glycol adipate chain, having a viscosity in dioxane of 0.63 and a glass transition temperature of −30°C.

6. A polymeric acetal as set forth in claim 3, in which

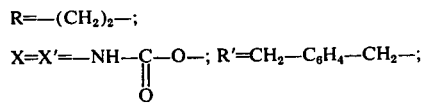

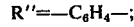

and A is as defined in claim 1, where R''' is a polybutadiene glycol chain, having a viscosity in benzene of 0.75 and a glass transition temperature of −40°C.

7. A polymeric acetal as set forth in claim 3, in which

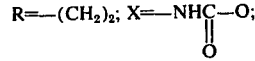

R' is absent; X' is absent; R'' = —CH$_2$CH$_2$OCH$_2$CH$_2$OCH$_2$CH$_2$—; and A is absent, having a viscosity in dioxane of 0.39 and a glass transition temperature of −15°C.

8. Polymeric acetal as set forth in claim 1, in which

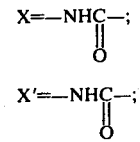

and R, R', R'', R''', n and A are as defined in claim 1, having molecular weights of 20,000 to 55,000, viscosities in benzene or dioxane of 0.5 to 0.8 and glass transition temperatures of −3°C to −25°C.

9. Polymeric acetal as set forth in claim 1, in which

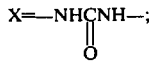

X' and R' are absent; and R, R'', R''', n and A are as defined in claim 1, having molecular weights of 10,000 to 44,000 viscosities in benzene or dioxane of 0.4 to 0.6 and glass transition temperatures of −2°C to −18°C.

10. A process for the production of polymeric acetals of the formula:

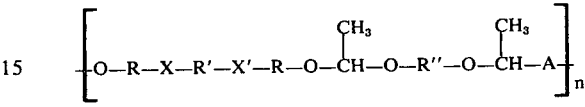

where
R is an alkylene with 1 to 6 carbon atoms;

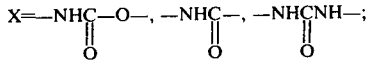

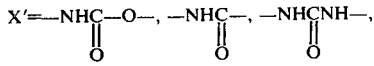

or is absent;
R' is an alkylene with 1 to 10 carbon atoms, an arylene, a biarylene, or is absent;
R'' is an alkylene with 1 to 6 carbon atoms, an oxaalkylene with 1 to 8 carbon atoms, a cycloalkylene, an arylene, or a biarylene;
A is absent;
n is from 20 to 110, comprising effecting a reaction of polyaddition of a diol of the formula:
HO—R—X—R'—X'R—OH,
where R, R', X and X' are as, defined above, with a divinyl ether of the formula:
CH$_2$ = CH-O-R''O-CH = CH$_2$,
where R'' is as defined above, in the presence of an acid catalyst.

11. A process as set forth in claim 10, in which the acid catalyst is selected from the group comprising sulfuric acid, hydrochloric acid, phosphoric acid, p-toluenesulfonic acid, boron trifluoride, tin tetrachloride, triphenyl methylcarbonium hexachlorantimonate, and complexes of said acids with organic bases selected from the group comprising diethyl ether, dibutyl ether, dipropyl ether, hexamethylphosphoramide and dioxane.

12. A process as set forth in claim 11, in which said catalyst is utilized in a concentration of from 0.001 to 1 percent by weight.

13. A process as set forth in claim 10, in which said diol is selected from the group comprising 2,4-xylylene-bis-(2-hydroxyethyl)-carbamate, bis-(2-hydroxyethyl)-carbamate, piperazine-N,N'-bis-(2-hydroxyethyl)-carbamate, diethylol urea, dimethylol urea, N,N'-dimethylol adipinamide, N,N'-diethylol succinamide, N,N'-dimethylol sebamide and N,N'-dimethylol terephthalamide.

14. A process as set forth in claim 10, in which said divinyl ether is selected from the group comprising divinyl ether, divinyloxymethylene, divinyl ether of ethylene glycol, divinyl ether of diethylene glycol, divinyl ether of triethylene glycol, divinyl ether of hydroquinone, divinyl ether of 2,2-diphenylol propane, n,n'- divinyloxydiphenyl, 1,4-divinyloxycyclohexane, and 1,4-divinyloxynaphthalene.

15. A process as set forth in claim 10, in which the molar ratio of said diol to said divinyl ether is approximately equal to unity.

16. A process as set forth in claim 10, in which the polyaddition reaction is carried out in the presence of an organic solvent inert to the initial components.

17. A process for the production of polyacetalurethane as set forth in claim 10, in which

R=—(CH$_2$)$_2$—;

R'=—CH$_2$—C$_6$H$_4$—CH$_2$—; X=X'=—NHC(=O)—O—; R''=—CH$_2$CH$_2$OCH$_2$CH$_2$—;

and A is absent, wherein the diol is 2,4-xylylene-bis-(2-hydroxyethyl)-carbamate and the ether is divinyl ether of diethylene glycol.

18. A process for the production of a polymeric acetal as set forth in claim 10, in which R = —(CH$_2$)$_2$—; R' is absent;

X=—NHC(=O)—O—;

X' is absent and A is absent, wherein the diol is bis-(2-hydroxyethyl)-carbamate and the ether is triethylene glycol vinyl ether.

19. A process for the production of polymeric acetals of the formula:

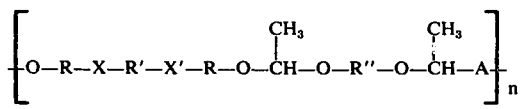

where
R is an alkylene with 1 to 6 carbon atoms;

X=—NHC(=O)—O—, —NHC(=O)—, —NHC(=O)NH—:

X'=—NHC(=O)—O—, —NHC(=O)—, —NHC(=O)NH—, or is absent;
R' is an alkylene with 1 to 10 carbon atoms, an arylene, a biarylene, or is absent;
R'' is an alkylene with 1 to 6 carbon atoms, an oxaalkylene with 1 to 8 carbon atoms, a cycloalkylene, an arylene, or a biarylene;
A has the formula:

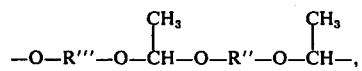

where R''' is a chain of polymeric diol having OH end-groups with a molecular weight of from 500 to 5,000;
$n$ is from 20 to 110, comprising effecting a polyaddition reaction of a mixture composed of a diol of the formula:
HO—R—X—R'—X'—R—OH, where R, R', X and X' are as defined above, and a polymeric diol having a molecular weight of from 500 5,000 with OH end-groups, with a divinyl ether of the formula:
CH$_2$ = CH—O—R''—O—CH = CH$_2$, where R'' is as defined above, in the presence of an acid catalyst.

20. A process as set forth in claim 19, in which said polymeric diol with OH end-groups having a molecular weight of from 500 to 5,000 is selected from the group comprising polybutadiene glycol, polyisoprene glycol, polyethylene glycol adipate, polyethylene glycol sebacate, polyethylene glycol azelate, polyethylene glycol terephthalate, polyethylene glycol isophthalate, polyethylene oxide diol, polytetramethylene oxide diol, and copolymers of ethylene oxide and tetramethylene oxide with propylene oxide.

21. A process as set forth in claim 19, in which the acid catalyst is selected from the group comprising sulfuric acid, hydrochloric acid, p-toluenesulfonic acid, phosphoric acid, boron trifluoride, tin tetrachloride, and complexes of said acids with organic bases, selected from the group comprising diethyl ether, dibutyl ether, dipropyl ether, hexamethylphosphoramide, dioxane and tetrahydrofuran.

22. A process as set forth in claim 19, in which said catalyst is utilized in a concentration of from 0.001 to 1 percent by weight.

23. A process as set forth in claim 19, in which the molecular ratio of the mixture of said diol and said polymeric diol having OH end-groups of molecular weight from 500 to 5,000 to said divinyl ether is approximately equal to unity.

24. A process as set forth in claim 19, in which the ratio of said diol to said polymeric diol having OH end-groups of molecular weight from 500 to 5,000 is from about 0.25 to about 0.75.

25. A process as set forth in claim 19, in which said diol is selected from the group comprising 2,4-xylylene-bis-(2-hydroxyethyl)-carbamate, bis-(2-hydroxyethyl)-carbamate, piperazine-N,N'-bis-(2-hydroxyethyl)-carbamate, dimethylol urea, diethylol urea, N,N'-dimethylol adipamide, N,N'-diethylol oxalamide, N,N'-dimethylol sebacate and N,N'-dimethylol terephthalamide.

26. A process as set forth in claim 19, in which said divinyl ether is selected from the group comprising vinyl ether, divinyloxymethylene, divinyl ether of diethylene glycol, divinyl ether of triethylene glycol, divinyl ether of hydroquinone, divinyl ether of 2,2-diphenylol propane, n,n'-divinyloxydiphenyl and 1,4-divinyloxycyclohexane.

27. A process for the production of a polymeric acetal as set forth in claim 19, in which

R=—(CH$_2$)$_2$—;

R'=—CH$_2$—C$_6$H$_4$—CH$_2$—; X=X'=—NHC(=O)—O—;

R''=—CH$_2$CH$_2$—O—CH$_2$CH$_2$—;

and A is as defined in claim 19, where R''' is a polyethylene glycol adipate chain, comprising the reaction product of a mixture of 2,4-xylylene-bis-(2-hydroxyethyl)-carbamate and polyethylene glycol adipate having OH endgroups with divinyl ether of diethylene glycol.

28. A process for the production of a polymeric acetal as set forth in claim 19, in which $R = -(CH_2)_2-$;

$R' = -CH_2-C_6H_4-CH_2-$; $X = X' = -NHC(=O)-O-$; $R'' = -C_6H_4-$;

and A is as defined in claim 19, where $R'''$ is a polybutadiene glycol chain, comprising a reaction of polyaddition of a mixture of 2,4-xylylene-bis-(2-hydroxyethyl), carbamate and polybutadiene glycol having OH end-groups of molecular weight 1,300 to divinyl ether of hydroquinone.

29. Polymeric acetal according to claim 1 wherein n is equal to 20 to 110.

\* \* \* \* \*